United States Patent [19]

Sullivan et al.

[11] Patent Number: 4,550,778
[45] Date of Patent: Nov. 5, 1985

[54] WELL SCREEN

[75] Inventors: Dale W. Sullivan, Wayne; Kermit W. Janssen, Valley Forge, both of Pa.; Andrew Mitchell, Pompano Beach, Fla.

[73] Assignee: CertainTeed Corporation, Valley Forge, Pa.

[21] Appl. No.: 505,904

[22] Filed: Jun. 20, 1983

[51] Int. Cl.⁴ ............................................. E21B 43/08
[52] U.S. Cl. ..................................... 166/234; 210/499
[58] Field of Search ............... 166/231, 232, 233, 234, 166/235, 236, 227, 157, 158; 175/314; 210/493.5, 499

[56] References Cited

U.S. PATENT DOCUMENTS

| | | | |
|---|---|---|---|
| 447,882 | 3/1891 | King | 166/227 |
| 1,602,449 | 10/1926 | Poe | 166/234 |
| 1,994,344 | 3/1935 | Harrington | 166/227 |
| 3,777,893 | 12/1973 | Ginaven | 210/499 |
| 4,262,744 | 4/1981 | Mitchell | 166/227 |
| 4,352,512 | 10/1982 | Janssen | 285/419 |

FOREIGN PATENT DOCUMENTS 1191667  4/1961  Fed. Rep. of Germany ...... 210/499

Primary Examiner—Stephen J. Novosad
Assistant Examiner—William P. Neuder
Attorney, Agent, or Firm—Paul & Paul

[57] ABSTRACT

A well screen is provided, for insertion into a well, for screening out sand and other particles from the well, and for connection at its upper end to a pipe for delivering water or other liquid up from the well, with the well screen having a skin with slits in it for passage of liquid therethrough, and with the skin having internal rigidifying supports. The skin is provided with a surface area increase in the form of undulations preferably of sawtooth configuration throughout its surface, and is preferably thinwalled. The screen is preferably of thermoplastic construction.

6 Claims, 5 Drawing Figures

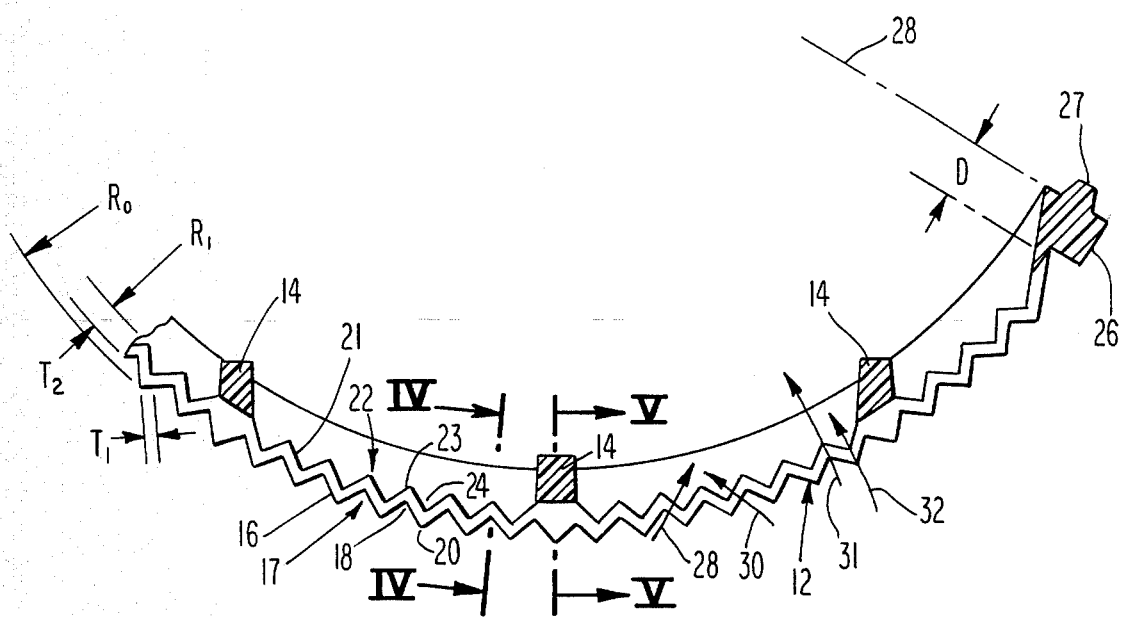
Fig. 3
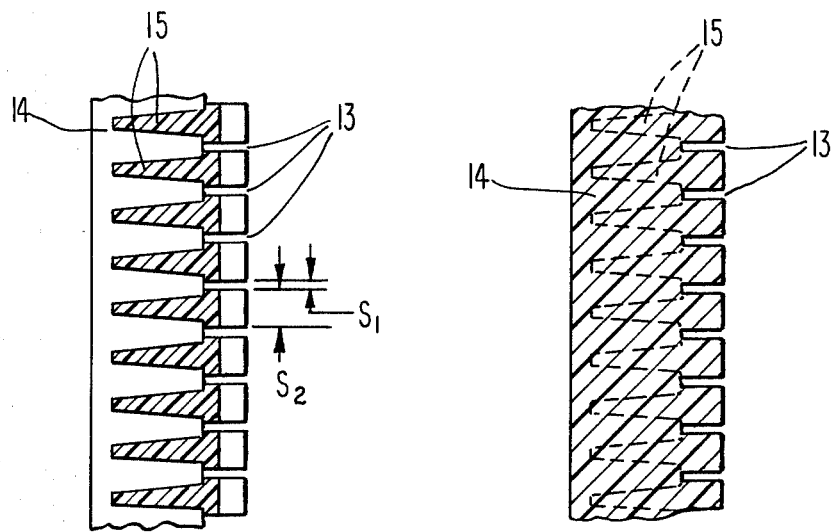
Fig. 4  Fig. 5

WELL SCREEN

FIELD OF THE INVENTION

This invention relates to devices for screening particulates from liquids, and most specifically to well screens.

BACKGROUND OF THE INVENTION

In drilling wells for water, oil, etc., or in otherwise making an extended hole in the ground, for the same purpose, it is known that one winds up with a hole of a certain depth, at the bottom of which is the liquid that is to be drawn up from the ground, preferably by placing a pump or other device in the well.

It has become commonplace to provide a well screen at the bottom of the well, to screen out sand and other particulate material from the zone at the bottom of the well, so that a pump may be lowered into the well, to pump the liquid under conditions in which the pump will be free of particulate material that might otherwise be damaging. Even in those instances when a pump is not inserted into the bottom of the well, as for example when suction devices are used, it is still nevertheless desirable to have sand or other particulate material screened out of the liquid entering the hole. Accordingly, it has become commonplace to construct well screens and to place them at the bottom of the well. Frequently, such screens are generally cylindrical in shape, and usually have the lower end closed off, with an open upper end, for attachment of a pipe or similar conduit to the well screen at its upper end. Thereafter, a number of lengths of pipe may serially be connected together, as needed, to provide for delivery of liquid from the well screen, to a location generally above ground.

In recent years, well screens have been constructed of synthetic polymeric materials, such as polyvinyl chloride (PVC), because of the corrosion resistant characteristics of such materials, as well as their bacteria resistant characteristics.

Such well screens may be made in a single piece, or in multiple sections that are secured together, by heat sealing, solvent sealing, vibration sealing, or other forms of sealing or welding, as may be desired, some of which are discussed in U.S. Pat. No. 4,352,512, the entire disclosure of which is herein incorporated by reference. Also, fittings of various pipe sections together, and of the lower-most pipe section to a well screen, or of well screens one to the other, in serial fashion, may be made by any suitable technique, such as by the bayonet type locking arrangements integrally molded with the screens and pipe sections, such as is also disclosed in the above-mentioned patent, particularly when the screens are constructed of a molded polymeric material in which the protrusions and recesses of the bayonet type of locks may be readily integrally molded therewith.

Additionally, when the well screens are constructed of moldable material, it is known to mold rigidifying supports, of both the radial or ring-like type, and of the upstanding, inwardly directed and axially or longitudinally extending type, as part of the well screen, integral therewith, for efficiency and economy in construction. In addition to the disclosure of the above-mentioned patent, reference is made in this regard to U.S. Pat. No. 4,262,744, the complete disclosure of which is also herein incorporated by reference. In this patent also, it is taught that a plurality of spaced slots may be formed in the skin extending therethrough with the slots disclosed in portions of the skin located between adjacent compression ribs, and with the slots extending essentially entirely around the periphery of a preferably tubular well screen, in order to maximize filtration over the surface of the well screen.

THE PRESENT INVENTION

The present invention is directed to further maximizing the slotted area on a given well screen to permit an increase in the open area through which the fluid can enter the screen. This is made possible by making the structure of the surface of the screen so that it has increased area, and is accomplished most specifically by providing it with preferably longitudinal undulations, to give it a fluted design, preferably of sawtooth cross section. This is particularly helpful when a multiple part well screen is utilized, as for example, as in U.S. Pat. No. 4,352,512. When a multiple part screen is utilized, those portions of the screen that are joined together, at the end of each arcuate part, result in a loss of screen area where the joints are effected. This occurs irrespective of the number of parts being joined together, whether two parts, three parts, etc. However, even in instances in which the screen may be molded as a single unit, the present invention effects an increase in screening area.

SUMMARY OF THE INVENTION

The present invention is directed toward increasing the screen area of a well screen by providing a fluted surface for the screen, while also maximizing the slotted area in the screen through which fluid may pass, and preferably doing so with a screen that is sufficiently thin-walled that the skin area undergoes a real increase. In instances in which the screen is constructed as a tubular member of a plurality of components, and especially wherein the presence of joints at connection zones prevents the slotting of the screen at those locations along the joints, the additional screening area provided by utilizing a fluted screen in accordance with this invention, at least compensates for the loss in slotted area along the joints.

Accordingly, it is a primary object of this invention to provide a novel well screen.

It is another object of this invention to provide a well screen having an enhanced or larger slotted skin area.

It is a further object of this invention to provide a well screen having a fluted skin that, when slotted, at least compensates for loss in slotted area at joints, wherein the well screen is of the multiple-component molded type, having joints for connecting the components together.

It is another object of this invention to provide a well screen having enhanced slotted screening area, wherein the skin of the screen is fluted on both the interior and exterior, and especially wherein supporting ribs are provided integral therewith.

Other objects and advantages of the present invention will be readily apparent to those skilled in the art from a reading of the following brief descriptions of the drawing figures, detailed descriptions of the preferred embodiments and the appended claims.

BRIEF DESCRIPTIONS OF THE DRAWING FIGURES

FIG. 3 is a transverse sectional view taken through the well screen of FIG. 1, generally along the Line III—III of FIG. 2, and wherein the flutted or sawtooth arrangement for the skin, on both the inside and outside is illustrated, with FIG. 3 showing at its right-most end, a joint for a multiple-component well screen.

FIG. 4 is a fragmentary vertical sectional view taken generally along the Line IV—IV of FIG. 3.

FIG. 5 is a fragmentary vertical sectional view taken generally along the Line V—V of FIG. 3.

DETAILED DESCRIPTION OF THE PREFERRED EMBODIMENTS

Figure 1:
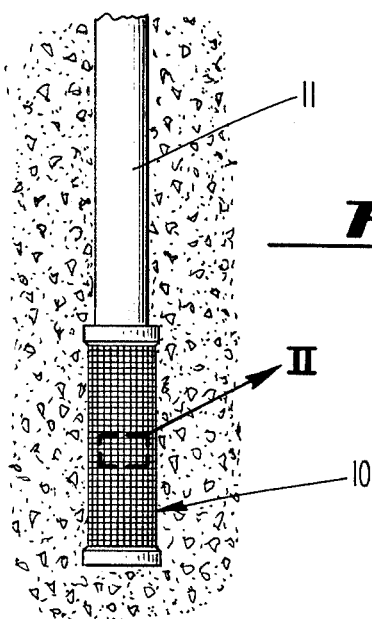
FIG. 1 is an elevational view of a well screen and attached conduit or piping, disposed in a hole in the ground.

Referring now to the drawings in detail, reference is first made to FIG. 1, wherein a well screen is shown, generally designated by the numeral 10, as being a multiple component well screen of a type preferably formed of at least two components, of synthetic polymeric material, such as PVC, with the components each being integrally molded together and then joined along their vertical joints by suitable sealing or welding techniques as have been discussed above.

The screen 10 has a suitable plastic pipe, conduit or the like 11 connected thereto at its upper end by any suitable connection means, such as by screw threads, by a bayonet connection, or the like. At the bottom of the well screen 10, there is provided a bottom closure plate (not shown).

Figure 2:
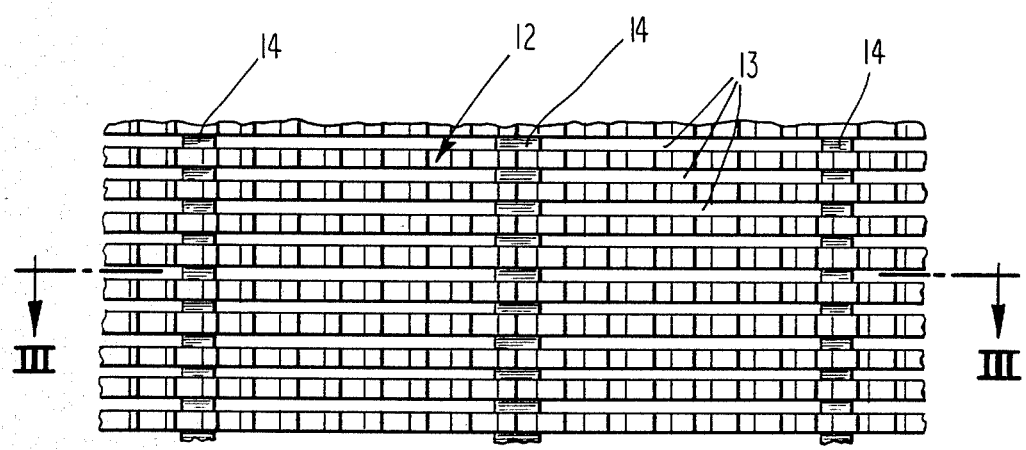
FIG. 2 is an enlarged fragmentary detailed view of that portion of the well screen of FIG. 1 indicated as II in the indicated detail of FIG. 1, shown in elevation in FIG. 2.

Referring now to FIG. 2, it will be seen that the skin 12 of the screen 10 is provided with a plurality of transverse slits 13, extending through the wall of the skin. Behind the skin 12, there are provided a plurality of longitudinal or vertical ribs 14, molded integrally therewith. The ribs 14 are also molded integrally with a plurality of vertically spaced-apart compression ribs 15 that extend around the interior of the screen. It will be noted that the skin 12 of the screen is substantially thin-walled, and is provided with the ring-like ribs 15 for lending stability thereto, and that the ribs 15 taper from a more outward portion to a more inward portion as shown in FIG. 4, in vertical cross-section, in order to allow free passage of water or other liquid therebetween from outside to inside, without substantially restricting the flow. It will also be noted that the vertical ribs 14 extend radially inwardly of the inward or leftward extension of the ribs 15 as viewed in FIG. 4, to allow for longitudinal placement of a pump or the like therein, without becoming encumbered on transverse ribs 15.

With reference to FIGS. 3 and 4, in particular, it will be seen that the exterior 16 of the skin 12 is provided with vertical, or longitudinal flutes 17, comprised of alternating channels 18 and mounds 20, one after the other, substantially around the periphery of the skin 12. Similarly, the interior 21 of the skin 12 is provided with fluting 22, likewise comprised of alternating mounds 23 and channels 24 respectively disposed inside the outer respectively associated channels 18 and mounds 20, providing a sawtooth arrangement as illustrated in FIG. 3, with the mounds and channels being intersected by the slots 13.

It will be seen that the slots 13 do not intersect the vertical ribs 14, but otherwise extend substantially completely around the periphery of the skin 12, with the exception of that portion of the periphery of the screen having joints 26. It will be understood that if a two component screen is utilized, such will be comprised of a pair of half tubular portions, each preferably having some mechanical joint structure, such as for example, a vertical protrusion 27 adapted to be received within a complementarily configured vertical recess in the half tubular portion to be disclosed thereagainst along a parting line 28, for solvent sealing, vibration welding, etc. of the two components together along such line. Therefore, at the location of each joint 26, it will be preferable not to provide a slot. However, if desired, the slot may extend completely around the periphery, but such would be a groove, ineffective for flow through the screen at joint locations 26.

It will be noted that the interior mounds 23, collectively define a surface of revolution $R_i$, and that the external mounds 20 collectively define a surface of revolution $R_o$, and that the thickness of the skin, whether measured at its wall thickness, $T_1$, or at the apex of a mound, $T_2$, in either case, is of a lesser dimension than the difference between said radii $R_i$ and $R_o$, and that this thin-walled feature for the skin 12 assures that the aggregate flow surface area is enhanced over and above the flow area that would be presented with a smooth-surfaced screen. For example, reference is made to FIG. 3, wherein arrows 28 and 30 demonstrate that flow may be across the thin-walled portions of the skin 12 along the paths of arrows 28 and 30, as well as generally radially inwardly along the paths of arrows 31 and 32, for enhancing fluid flow. With such a corrugation for the skin 12, the wall thickness of the skin remains essentially uniform, notwithstanding the presence of the channels. It will also be noted, in order to maximize the number of slots 13, a slot is present between each compression rib 15, as can be seen with reference to FIG. 4.

It will be seen from the foregoing that the well screen provided herewith is able to accomplish the ends of this invention. It will also be understood that various modifications may be made in the details of construction of this invention, all within the spirit and scope of the invention as defined in the appended claims. For example, while this invention is particularly adapted to offsetting a minor loss of flow surface area caused by the presence of joints when a multiple-component screen is utilized, it is likewise particularly adaptable to enhancing the flow surface area of a single component well screen. Also, while, for example, the slots are described as being transverse or substantially transverse, it will be understood that within such a definition, the slot would also be spiral or helical, in which case the circumferential ribs would likewise also preferably be spiral or helical, and that such a construction would remain within the scope of this invention. Other details of construction and variations will further be understood. It will be apparent that this invention is adapted for use with screens of various sizes and shapes, and with many variations of relationships between slot thickness $S_1$ and slot spacing $S_2$, all within the spirit and scope of this invention.

What is claimed is:

1. A well screen of generally hollow tubular configuration and comprised of at least one molded screen portion, such screen comprising a peripheral skin, rib means inwardly of the skin providing rigidifying support for the skin, said skin being of fluted construction defining a plurality of alternating longitudinal channels and longitudinal mounds on the outer peripheral surface thereof, and a plurality of longitudinally spaced slots in the skin, extending generally transverse to the axis of the tube, and creating openings through the skin, wherein said skin is further characterized by a plurality of longitudinal channels on the inner peripheral surface thereof, wherein said skin is of sawtooth configuration on both inner and outer peripheral surfaces when viewed in transverse cross-section, comprised of alternating mounds and channels on one surface complementarily aligned through the wall with alternating channels and mounds respectively on the opposite surface.

2. A well screen of generally hollow tubular configuration and comprised of at least one molded screen portion, such screen comprising a peripheral skin, rib means inwardly of the skin providing rigidifying support for the skin, said skin being of fluted construction defining a plurality of alternating longitudinal channels and longitudinal mounds on the outer peripheral surface thereof, and a plurality of longitudinally spaced slots in the skin, extending generally transverse to the axis of the tube, and creating openings through the skin, wherein said skin is further characterized by a plurality of longitudinal channels on the inner peripheral surface thereof, wherein the channels on each said surface are separated by spaced mounds, with the mounds on the inner surface generally collectively defining a surface of revolution of a first radius, with the mounds on the outer surface generally collectively defining a surface of revolution of a second larger radius, and with the skin thickness being of a lesser dimension than the difference between said radii.

3. A well screen of generally hollow tubular configuration and comprised of at least one molded screen portion, such screen comprising a peripheral skin having rib means inwardly thereof to provide rigidifying support, said skin characterized by a plurality of alternating longitudinal channels and longitudinal mounds on both the inner and outer peripheral surfaces thereof, with the mounds on the inner surface generally collectively defining a surface of revolution of a first radius and the mounds on the outer surface generally collectively defining a surface of revolution of a second larger radius, and with the skin thickness being of a lesser dimension than the difference between said radii and a plurality of longitudinally spaced slots extending generally transverse to the axis of the tube wherein said slots extend completely through the skin, to a depth of the surface of revolution of said first radius.

4. A well screen of generally hollow tubular configuration and comprised of at least one molded screen portion, such screen comprising a peripheral skin, rib means inwardly of the skin providing rigidifying support for the skin, said skin being of fluted construction defining a plurality of alternating longitudinal channels and longitudinal mounds on the outer peripheral surface thereof, and a plurality of longitudinally spaced slots in the skin, extending generally transverse to the axis of the tube, and creating openings through the skin, wherein said slots are substantially continuous around the skin to provide openings substantially free of flow obstruction through said skin, with the rib means comprising supports for the skin in a longitudinal direction, which supports are each generally spaced apart a distance that is at least a multiple of the spacing of adjacent said channels and comprises means defining lengths of said openings that are each generally at least a multiple of the spacing of adjacent said channels.

5. A well screen of generally hollow tubular configuration and comprised of at least one molded screen portion, such screen comprising a peripheral skin having rib means inwardly thereof to provide rigidifying support, said skin characterized by a plurality of alternating longitudinal channels and longitudinal mounds on both the inner and outer peripheral surfaces thereof, with the mounds on the inner surface generally collectively defining a surface of revolution of a first radius and the mounds on the outer surface generally collectively defining a surface of revolution of a second larger radius, and with the skin thickness being of a lesser dimenson than the difference between said radii and a plurality of longitudinally spaced slots extending generally transverse to the axis of the tube wherein said slots are substantially continuous around the skin to provide openings substantially free of flow obstruction through said skin, with the rib means comprising supports for the skin in a longitudinal direction, which supports are each generally spaced apart a distance that is at least a multiple of the spacing of adjacent said channels and comprises means defining lengths of said openings that are each generally at least a multiple of the spacing of adjacent said channels.

6. The well screen of any of claims 1 to 3, 4 and 5, wherein said rib means include a plurality of spaced compression ribs extending generally transversely inwardly from the skin toward the hollow interior of the screen body and a plurality of longitudinal ribs inwardly of the skin connecting compression ribs, and wherein said slots are located in said skin generally between said compression ribs.

* * * * *